(12) United States Patent
Kleiman et al.

(10) Patent No.: US 7,080,278 B1
(45) Date of Patent: Jul. 18, 2006

(54) TECHNIQUE FOR CORRECTING MULTIPLE STORAGE DEVICE FAILURES IN A STORAGE ARRAY

(75) Inventors: Steven R. Kleiman, Los Altos, CA (US); Robert M. English, Menlo Park, CA (US); Peter F. Corbett, Lexington, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 508 days.

(21) Appl. No.: 10/094,086

(22) Filed: Mar. 8, 2002

(51) Int. Cl.
*G06F 11/00* (2006.01)

(52) U.S. Cl. .................. 714/6; 714/755; 714/800; 714/804

(58) Field of Classification Search ............ 714/6, 714/804
See application file for complete search history.

(56) References Cited

U.S. PATENT DOCUMENTS

| | | | |
|---|---|---|---|
| 3,876,978 A | 4/1975 | Bossen et al. | |
| 4,092,732 A | 5/1978 | Ouchi | |
| 4,201,976 A | 5/1980 | Patel | |
| 4,205,324 A | 5/1980 | Patel | |
| 4,375,100 A | 2/1983 | Tsuji et al. | |
| 4,467,421 A | 8/1984 | White | |
| 4,517,663 A | 5/1985 | Imazeki et al. | |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |
| 4,761,785 A | 8/1988 | Clark et al. | |
| 4,775,978 A | 10/1988 | Hartness | |
| 4,796,260 A | 1/1989 | Schilling et al. | |
| 4,817,035 A | 3/1989 | Timsit | |
| 4,825,403 A | 4/1989 | Gershenson et al. | |
| 4,837,680 A | 6/1989 | Crockett et al. | |
| 4,847,842 A | 7/1989 | Schilling | |
| 4,849,929 A | 7/1989 | Timsit | |
| 4,849,974 A | 7/1989 | Schilling et al. | |
| 4,849,976 A | 7/1989 | Schillling et al. | |
| 4,870,643 A | 9/1989 | Bultman et al. | |
| 4,899,342 A | 2/1990 | Potter et al. | |
| 4,989,205 A | 1/1991 | Dunphy, Jr. et al. | |
| 4,989,206 A | 1/1991 | Dunphy, Jr. et al. | |
| 5,077,736 A | 12/1991 | Dunphy, Jr. et al. | |
| 5,088,081 A | 2/1992 | Farr | |
| 5,101,492 A | 3/1992 | Schultz et al. | |
| 5,128,810 A | 7/1992 | Halford | |

(Continued)

OTHER PUBLICATIONS

U.S. Appl. No. 10/035,607, filed Dec. 28, 2001, Corbett et al.

(Continued)

*Primary Examiner*—Robert Beausoliel
*Assistant Examiner*—Philip Guyton
(74) *Attorney, Agent, or Firm*—Cesari and McKenna, LLP

(57) ABSTRACT

A technique efficiently corrects multiple storage device failures in a storage array. The storage array comprises a plurality of concatenated sub-arrays, wherein each sub-array includes a set of data storage devices and a local parity storage device that stores values used to correct a failure of a single device within a row of blocks, e.g., a row parity set, in the sub-array. Each sub-array is assigned diagonal parity sets identically, as if it were the only one present using a double failure protection encoding method. The array further includes a single, global parity storage device holding diagonal parity computed by logically adding together equivalent diagonal parity sets in each of the sub-arrays.

79 Claims, 5 Drawing Sheets

U.S. PATENT DOCUMENTS

| | | | |
|---|---|---|---|
| 5,148,432 | A | 9/1992 | Gordon et al. |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,258,984 | A * | 11/1993 | Menon et al. ................. 714/7 |
| 5,271,012 | A * | 12/1993 | Blaum et al. ................. 714/6 |
| 5,274,799 | A | 12/1993 | Brant et al. |
| 5,305,326 | A | 4/1994 | Solomon et al. |
| 5,351,246 | A | 9/1994 | Blaum et al. |
| 5,355,453 | A | 10/1994 | Row et al. |
| 5,410,667 | A | 4/1995 | Belsan et al. |
| 5,485,579 | A | 1/1996 | Hitz et al. |
| 5,513,192 | A * | 4/1996 | Janku et al. ................. 714/804 |
| 5,537,567 | A * | 7/1996 | Galbraith et al. ........... 711/114 |
| 5,579,475 | A | 11/1996 | Blaum et al. |
| 5,623,595 | A | 4/1997 | Bailey |
| 5,802,366 | A | 9/1998 | Row et al. |
| 5,805,788 | A | 9/1998 | Johnson |
| 5,812,753 | A | 9/1998 | Chiariotti |
| 5,832,198 | A * | 11/1998 | Lucht ........................... 714/6 |
| 5,862,158 | A | 1/1999 | Baylor et al. |
| 5,884,098 | A | 3/1999 | Mason, Jr. |
| 5,931,918 | A | 8/1999 | Row et al. |
| 5,941,972 | A | 8/1999 | Hoese et al. |
| 5,993,056 | A * | 11/1999 | Vaman et al. ............... 714/776 |
| 6,065,037 | A | 5/2000 | Hitz et al. |
| 6,079,042 | A * | 6/2000 | Vaman et al. ............... 714/755 |
| 6,092,215 | A | 7/2000 | Hodges et al. |
| 6,138,125 | A | 10/2000 | DeMoss |
| 6,138,201 | A | 10/2000 | Rebalski |
| 6,158,017 | A * | 12/2000 | Han et al. ...................... 714/6 |
| 6,223,300 | B1 | 4/2001 | Gotoh |
| 6,247,157 | B1 | 6/2001 | Edirisooriya |
| 6,425,035 | B1 | 7/2002 | Hoese et al. |
| 6,532,548 | B1 | 3/2003 | Hughes |
| 6,581,185 | B1 | 6/2003 | Hughes |

OTHER PUBLICATIONS

U.S. Appl. No. 10/035,603, filed Dec. 28, 2001, English et al.

Mario Blaum, Jim Brady, Jehoshua Bruck and Jai Menon. Evenodd: An Efficient Scheme for Tolerating Double Disk Failures in RAID Architectures. IEEE Transactions on Computers, vol. 44, No. 2, Feb. 1995.

Davis A. Patterson, Garth Gibson and Randy H. Katz, A Case of Redundant Arrays of Inexpensive Disks (RAIDS), Proceedings of ACM SIGMOD Conference on the Management of Data, pp. 109-116, 1988.

Anvin, Peter H, "*The Mathematics of RAID 6*," Dec. 2004.

Auspex 4Front NS2000, System Architecture, Network-Attached Storage For a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the 14th VLDB Conference, LA, CA (1988).

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M.., et al, Maximizing Performance in a Striped Disk Array, Proc. 1990 *ACM SIGARCH 17th Intern.* Symp. on Comp. Arch., Seattle, WA, May 1990, pp. 322-331.

Chen, Peter M., et al., *RAID:High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., "*A Comparison of High-Availability Media Recovery techniques*," in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988.).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., High Performance RAIT, *Tenth NASA Goddard Conference on Mass Storage Systems and Technologies and Nineteenth IEEE Symposium on Mass Storage Systems*, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., Optimizing Shadow Recovery Algorithms, *IEEE Transactions on Software Engineering*, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Li, Don, et al., *Authors' Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD RECORD (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Reddy, A. L. Narasimha, et al,. *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14th VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

Tekrom—"About RAID 6".

Tweten, David, *Hiding Mass Storage Under UNIX: NASA's MSS-II Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

\* cited by examiner

| DATA DISK 0 | DATA DISK 1 | DATA DISK 2 | DATA DISK 3 | DATA DISK 4 | ROW PARITY DISK | DIAGONAL PARITY DISK |
|---|---|---|---|---|---|---|
| D04 | D05 | D06 | D07 | D0X | P0 | P4X |
| D15 | D16 | D17 | D1X | D14 | P1 | P5X |
| D26 | D27 | D2X | D24 | D25 | P2 | P6X |
| D37 | D3X | D34 | D35 | D36 | P3 | P7X |

FIG. 1
(PRIOR ART)

TECHNIQUE FOR CORRECTING MULTIPLE STORAGE DEVICE FAILURES IN A STORAGE ARRAY

CROSS-REFERENCE TO RELATED APPLICATIONS

The present invention is related to the following co-pending and commonly assigned U.S. patent application Ser. No. 10/035,607 titled, *Row-Diagonal Parity Technique for Enabling Efficient Recovery from Double Failures in a Storage Array*, and Ser. No. 10/035,603 titled, *Correcting Multiple Block Data Loss in a Storage Array Using a Combination of a Single Diagonal Parity Group and Multiple Row Parity Groups*, which applications were filed on Dec. 28, 2001 and are hereby incorporated by reference as though fully set forth herein.

FIELD OF THE INVENTION

The present invention relates to arrays of storage systems and, more specifically, to a technique for efficiently reconstructing any one or combination of two failing storage devices of a storage array.

BACKGROUND OF THE INVENTION

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD).

The disks within a storage system are typically organized as one or more groups, wherein each group is operated as a Redundant Array of Independent (or Inexpensive) Disks (RAID). Most RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

In the operation of a disk array, it is anticipated that a disk can fail. A goal of a high performance storage system is to make the mean time to data loss (MTTDL) as long as possible, preferably much longer than the expected service life of the system. Data can be lost when one or more disks fail, making it impossible to recover data from the device. Typical schemes to avoid loss of data include mirroring, backup and parity protection. Mirroring is an expensive solution in terms of consumption of storage resources, such as disks. Backup does not protect data modified since the backup was created. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

As used herein, the term "encoding" means the computation of a redundancy value over a predetermined subset of data blocks, whereas the term "decoding" means the reconstruction of a data or parity block by the same process as the redundancy computation using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

It is common to store the direct XOR sum of data bits as the parity bit value. This is often referred to as "even parity". An alternative is to store the complement of the XOR sum of the data bits as the parity bit value; this is called "odd parity". The use of even or odd parity with respect to the invention disclosed herein is not specified. However, the algorithms referenced herein are described as if even parity is used, where such a distinction is relevant. Yet it will be apparent to those skilled in the art that odd parity may also be used in accordance with the teachings of the invention.

Parity schemes generally provide protection against a single disk failure within a parity group. These schemes can also protect against multiple disk failures as long as each failure occurs within a different parity group. However, if two disks fail concurrently within a parity group, then an unrecoverable loss of data is suffered. Failure of two disks concurrently within a parity group is a fairly common occurrence, particularly because disks "wear out" and because of environmental factors with respect to the operation of the disks. In this context, the failure of two disks concurrently within a parity group is referred to as a "double failure".

A double failure typically arises as a result of a failure of one disk and a subsequent failure of another disk while attempting to recover from the first failure. The recovery or reconstruction time is dependent upon the level of activity of the storage system. That is, during reconstruction of a failed disk, it is possible that the storage system remains "online" and continues to serve requests (from clients or users) to access (i.e., read and/or write) data. If the storage system is busy serving requests, the elapsed time for reconstruction increases. The reconstruction process time also increases as the size and number of disks in the storage system increases, as all of the surviving disks must be read to reconstruct the lost data. Moreover, the double disk failure rate is proportional to the square of the number of disks in a parity group. However, having small parity groups is expensive, as each parity group requires an entire disk devoted to redundant data.

Another failure mode of disks is media read errors, wherein a single block or section of a disk cannot be read. The unreadable data can be reconstructed if parity is maintained in the storage array. However, if one disk has already failed, then a media read error on another disk in the array will result in lost data. This is a second form of double failure. A third form of double failure, two media read errors in the same stripe, is unlikely but possible.

Accordingly, it is desirable to provide a technique that withstands double failures. This would allow construction of larger disk systems with larger parity groups, while ensuring that even if reconstruction after a single disk failure takes a long time (e.g., a number of hours), the system can survive a second failure. Such a technique would further allow relaxation of certain design constraints on the storage system. For example, the storage system could use lower cost disks and still maintain a high MTTDL. Lower cost disks typically have a shorter lifetime, and possibly a higher failure rate during their lifetime, than higher cost disks. Therefore, use of such disks is more acceptable if the system can withstand double disk failures within a parity group.

A known double failure correcting parity scheme is an EVENODD XOR-based technique that allows a serial reconstruction of lost (failed) disks. EVENODD parity requires exactly two disks worth of redundant data, which is optimal. According to this parity technique, all disk blocks belong to two parity sets, one a typical RAID-4 style XOR computed across all the data disks and the other computed along a set of diagonally adjacent disk blocks. Broadly stated, the disks are divided into blocks of the same size and grouped to form stripes across the disks. Within each stripe, the disk designated to hold parity formed by the set of diagonally adjacent disk blocks is called a diagonal parity disk and the parity it holds is called diagonal parity. Within each stripe, one block is selected from each of the disks that are not the diagonal parity disk in that stripe. This set of blocks is called a row parity set or "row". One block in the row of blocks is selected to hold row parity for the row, and the remaining blocks hold data. Within each stripe, one block is selected from each of all but one of the disks that are not the diagonal parity disk in that stripe, with the further restriction that no two of the selected blocks belong to the same row. This is called a diagonal parity set or "diagonal".

The diagonal parity sets in the EVENODD technique contain blocks from all but one of the data disks. For n data disks, there are n−1 rows of blocks in a stripe. Each block is on one diagonal and there are n diagonals, each n−1 blocks in length. Notably, the EVENODD scheme only works if n is a prime number. The EVENODD technique is disclosed in an article of IEEE Transactions on Computers, Vol. 44, No. 2, titled EVENODD: *An Efficient Scheme for Tolerating Double Disk Failures in RAID Architectures*, by Blaum et al, February, 1995. A variant of EVENODD is disclosed in U.S. Pat. No. 5,579,475, titled *Method and Means for Encoding and Rebuilding the Data Contents of up to Two Unavailable DASDs in a DASD Array using Simple Non-Recursive Diagonal and Row Parity*, by Blaum et al., issued on Nov. 26, 1996. The above-mentioned article and patent are hereby incorporated by reference as though fully set forth herein.

The EVENODD technique utilizes a total of p+2 disks, where p is a prime number and p disks contain data, with the remaining two disks containing parity information. One of the parity disks contains row parity blocks. Row parity is calculated as the XOR of all the data blocks that are at the same position in each of the data disks. The other parity disk contains diagonal parity blocks. Diagonal parity is constructed from p−1 data blocks that are arranged in a diagonal pattern on the data disks. The blocks are grouped into stripes of p−1 rows. This does not affect the assignment of data blocks to row parity sets. However, diagonals are constructed in a pattern such that all of their blocks are in the same stripe of blocks. This means that most diagonals "wrap around" within the stripe, as they go from disk to disk.

Specifically, in an array of n×(n−1) data blocks, there are exactly n diagonals each of length n−1, if the diagonals "wrap around" at the edges of the array. The key to reconstruction of the EVENODD parity arrangement is that each diagonal parity set contains no information from one of the data disks. However, there is one more diagonal than there are blocks to store the parity blocks for the diagonals. That is, the EVENODD parity arrangement results in a diagonal parity set that does not have an independent parity block. To accommodate this extra "missing" parity block, the EVENODD arrangement XOR's the parity result of one distinguished diagonal into the parity blocks for each of the other diagonals.

FIG. 1 is a schematic block diagram of a prior art disk array 100 that is configured in accordance with the conventional EVENODD parity arrangement. Each data block Dab belongs to parity sets a and b, where the parity block for each parity set is denoted Pa. Note that for one distinguished diagonal (X), there is no corresponding parity set. This is where the EVENODD property arises. In order to allow reconstruction from two failures, each data disk must not contribute to at least one diagonal parity set. By employing a rectangular array of n×(n−1) data blocks, the diagonal parity sets have n−1 data block members. Yet, as noted, such an arrangement does not have a location for storing the parity block for all the diagonals. Therefore, the parity of the extra (missing) diagonal parity block (X) is recorded by XOR'ing that diagonal parity into the parity of each of the other diagonal parity blocks. Specifically, the parity of the missing diagonal parity set is XOR'd into each of the diagonal parity blocks P4 through P7 such that those blocks are denoted P4X–P7X.

For reconstruction from the failure of two data disks, the parity of the diagonal that does not have a parity block is initially recomputed by XOR'ing all of the parity blocks. For example, the sum of all the row parities is the sum of all the data blocks. The sum of all the diagonal parities is the sum of all the data blocks minus the sum of the missing diagonal parity block. Therefore, the XOR of all parity blocks is equivalent to the sum of all the blocks (the row parity sum) minus the sum of all the blocks except the missing diagonal, which is just a parity of the missing diagonal. Actually, n−1 copies of the missing diagonal parity are added into the result, one for each diagonal parity block. Since n is a prime number, n−1 is even, resulting in the XOR of a block with itself an even number of times, which results in a zero block. Accordingly, the sum of the diagonal parity blocks with the additional missing parity added to each is equal to the sum of the diagonal parity blocks without the additional diagonal parity.

Next, the missing diagonal parity is subtracted from each of the diagonal parity blocks. After two data disks fail, there are at least two diagonal parity sets that are missing only one block. The missing blocks from each of those parity sets can be reconstructed, even if one of the sets is the diagonal for which there is not a parity block. Once those blocks are reconstructed, all but one member of two of the row parity sets are available. This allows reconstruction of the missing member of those rows. This reconstruction occurs on other diagonals, which provides enough information to reconstruct the last missing block on those diagonals. The pattern of reconstructing alternately using row then diagonal parity continues until all missing blocks have been reconstructed.

Since n is prime, a cycle is not formed in the reconstruction until all diagonals have been encountered, hence all the missing data blocks have been reconstructed. If n were not prime, this would not be the case. If both parity disks are lost, a simple reconstruction of parity from data can be performed. If a data disk and the diagonal parity disk are lost, a simple RAID-4 style reconstruction of the data disk is performed using row parity followed by reconstruction of the diagonal parity disk. If a data disk and the row parity disk are lost, then one diagonal parity may be computed. Since all diagonals have the same parity, the missing block on each diagonal can be subsequently computed.

Since each data block is a member of a diagonal parity set, when two data disks are lost (a double failure), there are two parity sets that have lost only one member. Each disk has a diagonal parity set that is not represented on that disk. Accordingly, for a double failure, there are two parity sets that can be reconstructed. EVENODD also allows reconstruction from failures of both parity disks or from any combination of one data disk and one parity disk failure. The technique also allows reconstruction from any single disk failure.

EVENODD is optimal in terms of the number of disks required; however, disk efficiency for this encoding technique is achieved at the cost of reconstruction performance. EVENODD treats the entire disk array as a single unit. When any disk in the array fails, the system must access all disks in the array to reconstruct the missing blocks. If a single disk fails in an array of n data disks, 1/n of the accesses can only be satisfied by reading all n−1 remaining disks plus the row parity disk. Accesses to other disks can be satisfied by a single read operation; thus, the average number of accesses per read is 2−1/n. For large n, this means that performance of the disk array degrades by a factor of two during reconstruction. In addition, the amount of work the system must do to recover from a failure (and thus the recovery time if the system is constrained) is also proportional to the disk array size. A system with 2n disks takes twice as long to recover as a system with n disks. Together, these factors limit the practical size of a RAID group even with protection with multiple disk failures.

SUMMARY OF THE INVENTION

The present invention comprises a technique for efficiently correcting multiple storage device failures in a storage array. The storage array comprises a plurality of concatenated sub-arrays, wherein each sub-array includes a set of data storage devices and a local parity storage device that stores parity values encoded with a single device error correction method used to correct a failure of a single device within a row of blocks, e.g., a row parity set, in the sub-array. Each sub-array is assigned diagonal parity sets identically, as if it were the only one present using a double failure protection encoding method. The array further includes a single, global parity storage device holding diagonal parity computed by logically adding together equivalent diagonal parity sets in each of the sub-arrays.

According to the invention, diagonal parity blocks are computed along the diagonal parity sets of each sub-array. The computed diagonal parity blocks of corresponding diagonal parity sets of the sub-arrays are then logically combined, e.g., using exclusive OR operations, for storage as the diagonal parity on the global parity storage device. The contents of the computed diagonal parity blocks of any sub-array can thereafter be reconstructed by subtracting the combined diagonal parity blocks of the other sub-arrays from diagonal parity stored on the global parity storage device. The global parity storage device can thus be used in connection with the local parity storage devices to correct any double failure within a single sub-array.

Notably, the double failure protection encoding method used in the invention is independent of the single device error correction method. In addition, there is no restriction on the method used to recover from a single device failure, as long as the method is row-oriented and the rows of blocks in each sub-array are independent, i.e., recovery cannot rely on information from other rows of blocks. The size of these rows need not be related to the size of the rows used to compute diagonal parity if this independence property holds.

Advantageously, the present invention allows efficient recovery of single failures in an array configured to enable recovery from the concurrent failure of two storage devices within a sub-array of the array. Upon the failure of any data blocks, each in a different sub-array, the invention enables recovery of the data blocks using the single device failure recovery method, e.g., local row parity. Upon the failure of any two blocks within a sub-array, the invention facilitates recovery using a combination of local row parity and global diagonal parity. That is, as long as only one sub-array has a double failure, the data can be recovered because the diagonal parity contributions of the other sub-arrays can be subtracted from the contents of the global parity storage device. In addition, the inventive technique reduces the computation load to compute parity stored in the array during failure-free operation. The technique further reduces the overhead of parity computation, and requires less computation compared to conventional schemes.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 1 is a schematic block diagram of a prior art disk array that is configured in accordance with a conventional EVENODD parity arrangement;

DETAILED DESCRIPTION OF AN ILLUSTRATIVE EMBODIMENT

Figure 2:
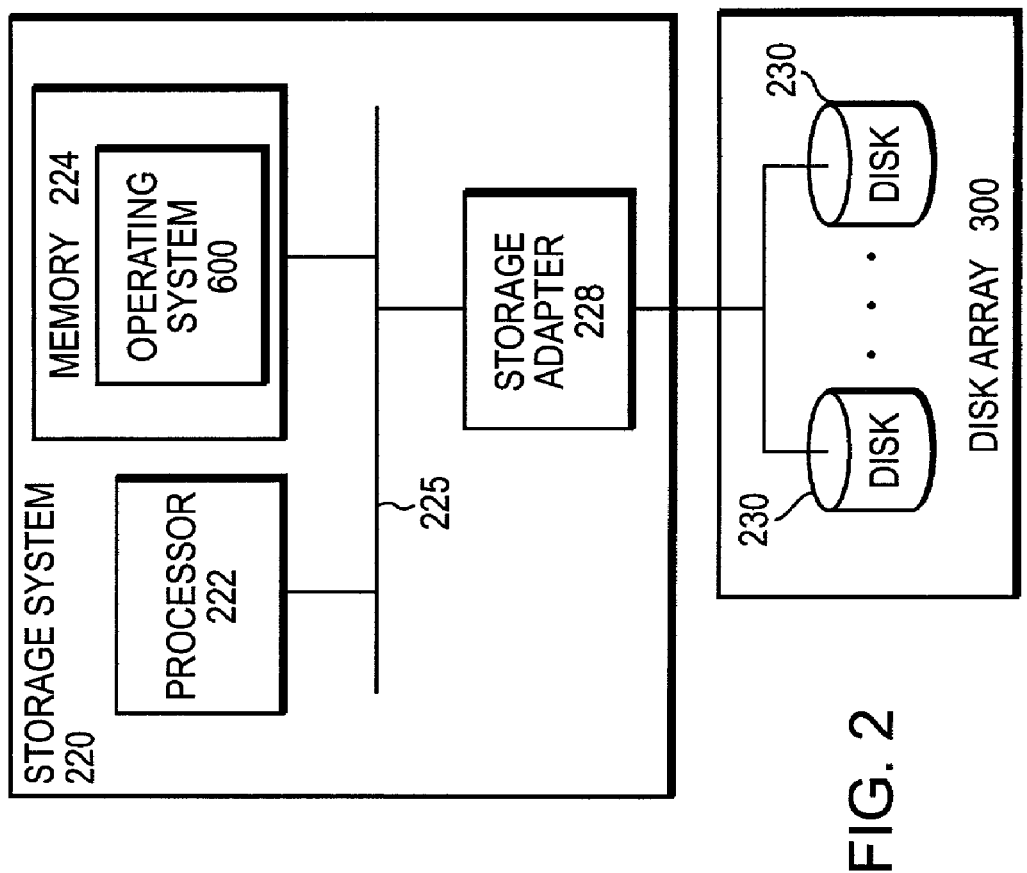
FIG. 2 is a schematic block diagram of an environment including a storage system that may be advantageously used with the present invention.

FIG. 2 is a schematic block diagram of an environment 200 including a storage system 220 that may be advantageously used with the present invention. The inventive technique described herein may apply to any type of special-purpose (e.g., file server or filer) or general-purpose computer, including a standalone computer or portion thereof, embodied as or including a storage system 220. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 220 comprises a processor 222, a memory 224 and a storage adapter 228 interconnected by a system bus 225. The memory 224 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 600, portions of which are typically resident in memory and executed by the processing elements, functionally organizes the system 220 by, inter alia, invoking storage operations executed by the storage system. It will be apparent to those skilled in the art that other processing and memory means, including various computer readable media, may be used for storing and executing program instructions pertaining to the inventive technique described herein.

The storage adapter 228 cooperates with the storage operating system 600 executing on the system 220 to access information requested by a user (or client). The information may be stored on any type of attached storage array of writeable storage element media such as video tape, optical, DVD, magnetic tape, bubble memory, electronic random access memory, micro-electro mechanical and any other similar media adapted to store information, including data and parity information. However, as illustratively described herein, the information is stored on storage devices such as the disks 230 (HDD and/or DASD) of storage array 300. The storage adapter includes input/output (I/O) interface circuitry that couples to the disks over an I/O interconnect arrangement, such as a conventional high-performance, Fibre Channel serial link topology.

Storage of information on array 300 is preferably implemented as one or more storage "volumes" that comprise a cluster of physical storage disks 230, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

The present invention comprises a technique for efficiently correcting multiple storage device failures in a storage array having a plurality of concatenated sub-arrays. The inventive technique is preferably implemented by a disk storage layer (shown at 624 of FIG. 6) of the storage operating system 600 to assign diagonal parity sets to each sub-array identically, as if it were the only one present in the array using a double failure protection encoding method. Each sub-array of the storage array includes a set of data storage devices (disks) and a local parity disk that stores parity values encoded with a single device error correction method used to correct a failure of a single disk within a row of blocks, e.g., a row parity set, in the sub-array. The array further includes a single, global parity disk holding diagonal parity.

Figures 3, 4:
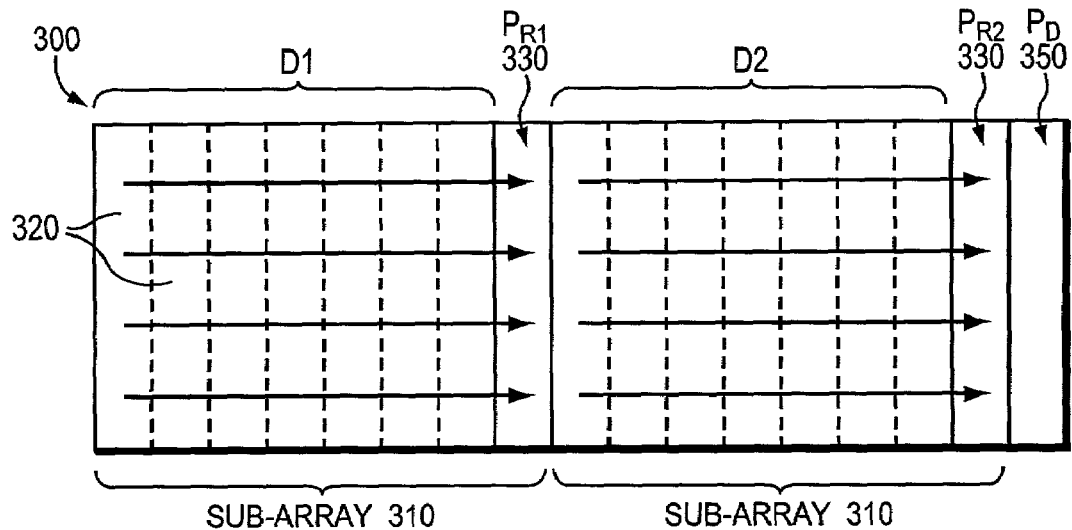
FIG. 3 is a schematic block diagram of a storage array comprising a plurality of concatenated sub-arrays that may advantageously used with the present invention.
FIG. 4 is a schematic block diagram of a disk array organized in accordance with a row-diagonal (R-D) parity encoding technique.

FIG. 3 is a schematic block diagram of storage array 300 organized as a plurality of concatenated sub-arrays 310, wherein each sub-array includes a set of data disks ($D_1$, $D_2$) and a local parity disk ($P_{R1}$, $P_{R2}$). Illustratively, each sub-array 310 is arranged as a concentrated parity, e.g., a RAID-4 style, disk array [A0, A2 . . . An] comprising a predetermined number (e.g., seven) of data disks 320 and a row parity disk 330. The cardinality of each sub-array is denoted by Ck (k=0 . . . n). To enable recovery from the concurrent failure of two disks in the array, a single diagonal parity disk is provided for the entire array instead of a diagonal parity disk (and row parity disk) for each sub-array. Therefore, the array further includes a global parity disk $P_D$ 350 holding diagonal parity that is computed by the disk storage layer by logically adding together equivalent diagonal parity sets in each of the sub-arrays 310. Double failures within a sub-array can be corrected using only one global diagonal parity disk 350 associated with the entire array. The novel technique thus reduces the number of disks needed to enable efficient recovery from the concurrent failure of two storage devices (disks) in the array.

According to the invention, diagonal parity blocks are computed along the diagonal parity sets of each sub-array. The computed diagonal parity blocks of corresponding diagonal parity sets of the sub-arrays are then logically combined, e.g., using exclusive OR (XOR) operations, for storage as diagonal parity on the single global parity disk 350. The contents of the computed diagonal parity blocks of any sub-array can thereafter be reconstructed by subtracting the combined diagonal parity blocks of the other sub-arrays from the diagonal parity stored on the global parity disk. The global parity disk can thus be used in connection with the local parity disks to correct any double failure within a single sub-array by noting that, when only one sub-array experiences a double failure, the other sub-arrays are essentially immaterial.

Notably, the double failure protection encoding method used in the invention is independent of the single device error correction method. In addition, there is no restriction on the method used to recover from a single disk failure (i.e., it need not be "row parity"), as long as the method is row-oriented and the rows of blocks in each sub-array are independent, i.e., recovery cannot rely on information from other rows of blocks. The size of these rows need not be related to the size of the rows used to compute diagonal parity if this independence property holds.

In the illustrative embodiment, each sub-array 310 is treated as if it were configured with a number of disks equal to a largest sub-array rounded up to a convenient prime number p by assuming any missing disks are zero. Each sub-array further contains p−1 rows of blocks. The novel multiple device failure correcting technique can preferably handle a (m*p+1)×(p−1) array of blocks, where m is any positive integer. Moreover, concatenation of the sub-arrays is based on "row-diagonal" double failure protection encoding, although other double failure protection encoding methods, such as conventional EVENODD (EO) encoding, may be used with the present invention.

Row-diagonal (R-D) encoding is a parity technique that provides double failure parity correcting recovery using row and diagonal parity in a disk array. Two disks of the array are devoted entirely to parity while the remaining disks hold data. The contents of the array can be reconstructed entirely, without loss of data, after any one or two concurrent disk failures. An example of a R-D parity technique that may be advantageously used with the present invention is disclosed in the co-pending and commonly-owned U.S. patent application Ser. No. 10/035,607 titled *Row-Diagonal Parity Technique for Enabling Efficient Recovery from Double Failures in a Storage Array*.

FIG. 4 is a schematic block diagram of a disk array 400 organized in accordance with the R-D parity encoding technique. Assume n equals the number of disks in the array, where n=p+1, and p is a prime number. The first n−2 disks (D0–3) hold data, while disk n−1 (RP) holds values encoded with a single device correction algorithm, e.g., row parity, for the data disks D0–D3 and disk n (DP) holds diagonal parity. The disks are divided into blocks and the blocks are grouped into stripes, wherein each stripe equals n-2 (i.e., p−1) rows of blocks. The diagonal parity disk stores parity information computed along diagonal parity sets ("diagonals") of the array. The blocks in the stripe are organized into p diagonals, each of which contains p−1 blocks from the data and row parity disks, and all but one of which contains a parity block on the diagonal parity disk. In addition, there are n−1 diagonals per stripe.

The data blocks and the row parity blocks are numbered such that each block belongs to a diagonal parity set and, within each row, each block belongs to a different diagonal parity set. The notation $D_{a,b}$ and $P_{a,b}$ denotes the respective contributions of data (D) and parity (P) blocks to specific row (a) and diagonal (b) parity computations. That is, the notation $D_{a,b}$ means that those data blocks belong to the row or diagonal used for purposes of computing row parity a and diagonal parity b, and $P_{a,b}$ stores the parity for row parity set a and also contributes to diagonal parity set b. For example, $P_{0,8}=D_{0,4}\char`\^D_{0,5}\char`\^D_{0,6}\char`\^D_{0,7}$, wherein "^" represents an XOR operator. The notation also includes the row parity block used for purposes of computing the diagonal parity for a particular diagonal, e.g., $P_4=D_{0,4}\char`\^D_{3,4}\char`\^D_{2,4}\char`\^P_{1,4}$. Note that each of the diagonal parity blocks stored on the diagonal parity disk represents contributions from all but one of the other disks (including the row parity disk) of the array. For example, the diagonal parity block $P_4$ has contributions from D0 ($D_{0,4}$), D2 ($D_{3,4}$), D3 ($D_{2,4}$) and RP ($P_{1,4}$), but no contribution from D1. Note also that the diagonal parity for diagonal 8 ($P_8$) is neither computed nor stored on the diagonal parity disk DP.

Specifically, the diagonal parity blocks on disk DP include the row parity blocks in their XOR computation. In other words, the diagonal parity stored on the disk DP is computed not only in accordance with the contents of the data disks but also with the contents of the row parity disk. Moreover, the diagonal parity disk contains parity blocks for each of the diagonals of a stripe except one. By encoding the diagonal parity blocks as shown in array 400, the system can recover from any two concurrent disk failures despite the missing diagonal parity ($P_8$). This results from the fact that the row parity blocks are factored into the computations of the diagonal parity blocks stored on the diagonal parity disk DP.

The recovery (reconstruction process) aspect of the R-D parity technique is invoked when two data disks (or one data disk and a row parity disk) within a sub-array are concurrently lost due to failure. With any combination of two failed data disks (or one data disk and a row parity disk), row parity cannot be immediately used to reconstruct the lost data; only diagonal parity can be used. Given the structure and organization of the array (i.e., the stripe length and stripe depth are not equal) each diagonal does not include (misses) a block from one of the disks. Therefore, when the two data disks are lost, two diagonals have lost only one member, i.e., for each of the two lost disks, there is one diagonal that does not intersect that disk, therefore no block from that diagonal is lost because of the failure of that disk. A diagonal parity block is stored on the diagonal parity disk for all but one diagonal; therefore, reconstruction of at least one, and usually two, of the missing blocks is initiated using diagonal parity.

Once a missing block is reconstructed, reconstruction of a row may be completed by reconstructing the other missing block on that row using row parity. When that other block is reconstructed, a determination is made as to whether the block belongs to a diagonal for which there is stored parity. If the block belongs to a diagonal for which there is parity, the other missing block on that diagonal can be reconstructed from the other disk that is on that diagonal using diagonal parity. That is, for all but the missing diagonal, once one block on the diagonal is reconstructed, the other can be reconstructed. The other missing block in that row parity set is then reconstructed. However, if the block belongs to a diagonal for which there is no parity (i.e, the missing diagonal), then a determination is made as to whether all blocks have been reconstructed. If not, the pattern of first reconstructing based on diagonal parity, then on row parity, continues until the last data block used in computation of the missing diagonal parity set is reached. Once all blocks have been reconstructed, the reconstruction process is complete.

Figure 5:
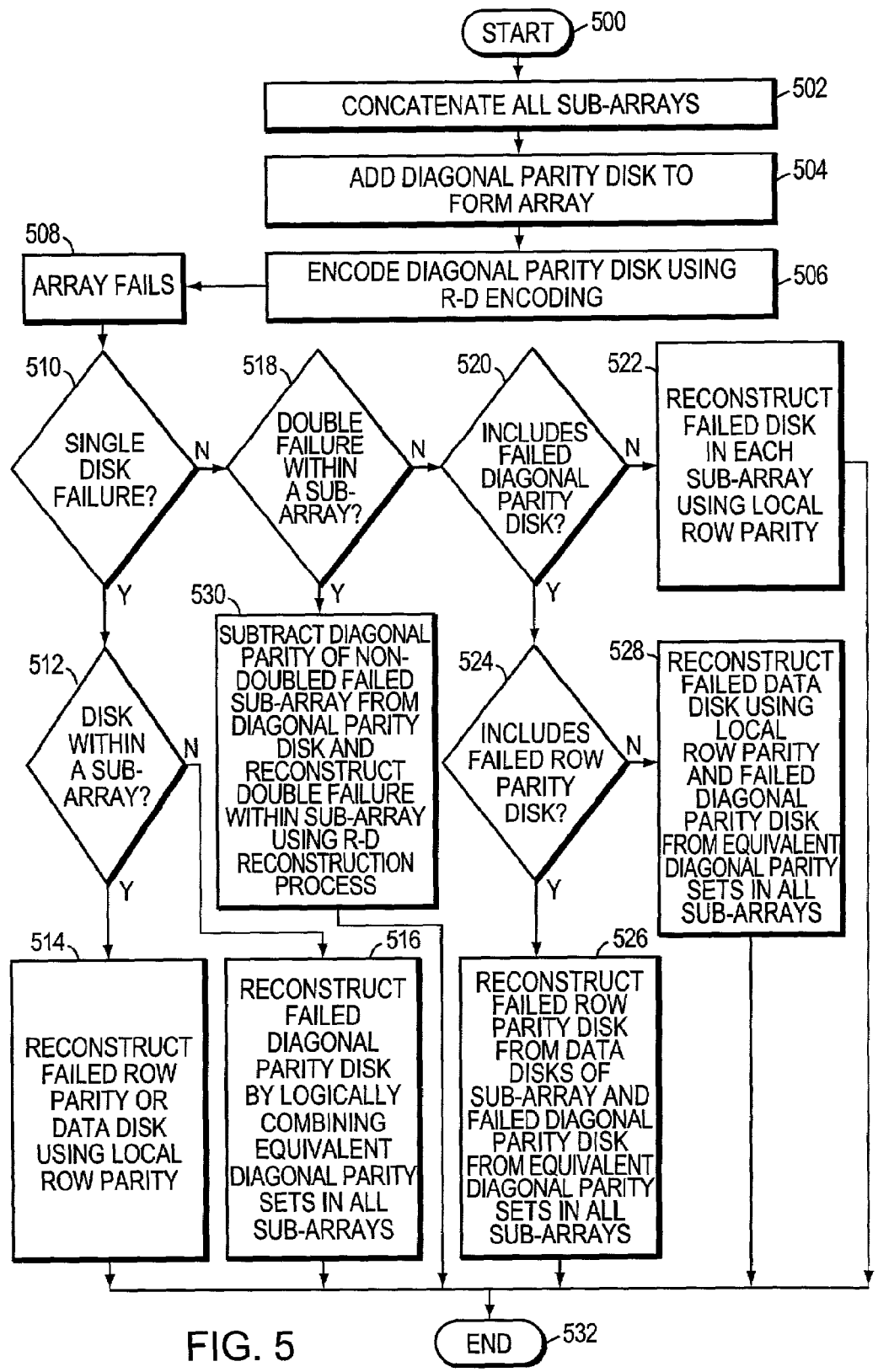
FIG. 5 is a flowchart illustrating the sequence of steps comprising a novel multiple device failure correcting technique applied to a concatenation of sub-arrays based on R-D encoding in accordance with the present invention.

FIG. 5 is a flowchart illustrating the sequence of steps comprising the novel multiple device failure correcting technique as applied to storage array 300 having a concatenation of sub-arrays 310 based on R-D encoding. The sequence starts in Step 500 and proceeds to Step 502 where all sub-arrays A[0–n], including row parity devices (disks) 330, are concatenated such that the total number of data and row parity disks over all Ck is prime. In Step 504, the diagonal parity disk 350 is added to form array 300. In Step 506, the contents of the diagonal parity disk 350 are encoded by computing the diagonal parity of each sub-array according to the R-D parity technique, combining the equivalent diagonal parity computations for each sub-array using XOR operations and storing them on the diagonal parity disk.

In Step 508, the array fails. If the failure is a single disk failure (Step 510), a determination is made in Step 512 as to whether the failure is to a disk in a sub-array. If so, the failed data or row parity disk is reconstructed in Step 514 using local row parity associated with that sub-array. The sequence then ends in Step 532. If the single failure is not to a disk of a sub-array, the failed global diagonal parity disk is reconstructed using all disks (data and row parity disks) of all sub-arrays of the entire array. This is because the diagonal parity sets (i.e., diagonals) span the entire array of disks. In particular, the diagonal parity stored on the failed global diagonal parity disk 350 is reconstructed in Step 516 by logically combining, e.g., using XOR operations, equivalent diagonal parity sets in the sub-arrays 310. The sequence then ends in Step 532.

If the failure is not a single disk failure, a determination is made in Step 518 as to whether the array failure is a double failure within a sub-array. If not, a determination is made in Step 520 as to whether the failure includes the diagonal parity disk. If not, each disk failure is either a data or row parity disk failure that occurs in a different sub-array and, in Step 522, the failed disk in each sub-array is reconstructed using local row parity. The sequence then ends in Step 532.

If one of the failures includes the global diagonal parity disk, then a determination is made is Step 524 as to whether the other failed disk includes a row parity disk. If so, failures to a row parity disk and the diagonal parity disk are reconstructed by first reconstructing the failed row parity disk from the data disks of the sub-array and then reconstructing the diagonal parity disk from equivalent diagonal parity sets in the sub-arrays (Step 526). The sequence then ends in Step 532. If not, failures to a data disk and the diagonal disk are reconstructed by first reconstructing the data disk from local row parity associated with the sub-array and then reconstructing the diagonal parity disk from equivalent diagonal parity sets in the sub-arrays (Step 528). The sequence then ends in Step 532.

In Step 530, two disk failures (a double failure) within a sub-array are globally recovered using the R-D reconstruction process. Here, two failures occur within disks protected by the same row parity; therefore, diagonal parity is needed for reconstruction. According to the invention, as long as only one sub-array has a double failure, the data can be recovered because the contribution of the other sub-arrays can be subtracted from the diagonal parity. Specifically, the diagonal parity of the non-double failed sub-arrays is are subtracted from the contents of the diagonal parity disk and then the data and/or row parity of the failed sub-array are reconstructed using the R-D technique. Note that since the conditions on the diagonal parity disk are generally the same as described with respect to the R-D parity technique, the diagonal parity disk is used to recover at least one data block within the failed sub-array. Once that block is recovered, row parity within the sub-array is used to recover the corresponding block in the other failed disk. This process continues in accordance with the R-D reconstruction process. The sequence then ends in Step 532.

Note that a difference between the present technique and the R-D technique is the observation that virtually any number of disks in the array may be row parity disks. The row parity disks essentially define sub-arrays within the array. Reconstruction based on local row parity involves only data disks (i.e., row parity sets) of the sub-array. Therefore, the inventive correcting technique allows more efficient (and easier) recovery of single failures in array 300 adapted to enable recovery from concurrent failures of two disks within a sub-array.

The invention further allows adding of a single diagonal parity disk to an existing array of data and row parity disks to thereby provide protection against double failures in the array. The R-D parity reconstruction algorithm may then be applied.

It should be further noted that the technique described herein is capable of correcting more than two failures in the array 300, provided that there are no more than two failures in any one sub-array, and that there is no more than one sub-array with two failures, and that if there are two failures in any sub-array, that the diagonal parity disk has not also failed. For example, assume there are three sub-arrays, each comprising one or more data disks and a row parity disk. The present invention enables recovery from a single disk (data or row parity) failure within each sub-array and another disk failure anywhere in the array, for a total of four disk failures within the entire array. In the case of two disk failures within a single sub-array, reconstruction begins by locating a diagonal parity set that has lost only one member. That is, reconstruction begins with a missing block from diagonal parity of a diagonal parity set not represented on one of the failed disks. From there, reconstruction of the other missing block in the row parity set can be effected, with the row-diagonal reconstruction procedure continuing until the last data block used in computation of the missing diagonal parity set is reached.

Advantageously, the present invention allows efficient recovery of single failures in an array configured to enable recovery from the concurrent failure of two storage devices within a sub-array of the array. Upon the failure of any data blocks, each in a different sub-array, the invention enables recovery of the data blocks using the single device failure recovery method, e.g., local row parity. Upon the failure of any two blocks within a sub-array, the invention facilitates recovery using a combination of local row parity and global diagonal parity. That is, as long as only one sub-array has a double failure, the data can be recovered because the diagonal parity contributions of the other sub-arrays can be subtracted from the contents of the global parity storage device.

Figure 6:
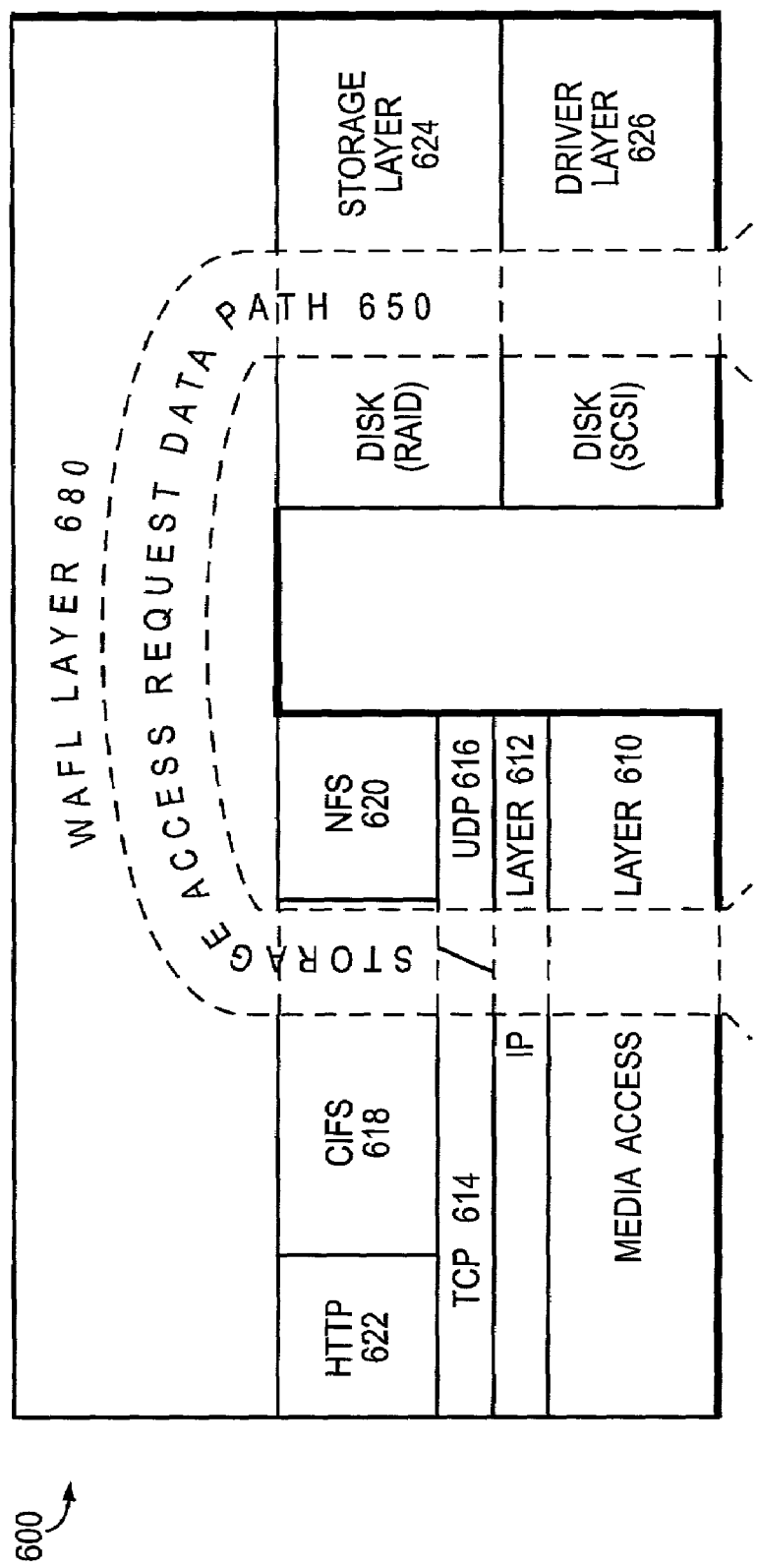
FIG. 6 is a schematic block diagram of a storage operating system that may be advantageously used with the present invention.

FIG. 6 is a schematic block diagram of the storage operating system 600 that may be advantageously used with the present invention. In the illustrative embodiment, the storage operating system is preferably the NetApp® Data ONTAP™ operating system available from Network Appliance, Inc., Sunnyvale, Calif. that implements a Write Anywhere File Layout (WAFL™) file system. As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented, for example, as an application program operating over a general-purpose operating system, such as UNIX® or Windows NT®, or as a general-purpose operating system with storage functionality or with configurable functionality, which is configured for storage applications as described herein.

The storage operating system comprises a series of software layers, including a media access layer 610 of network drivers (e.g., an Ethernet driver). The operating system further includes network protocol layers, such as the Internet Protocol (IP) layer 612 and its supporting transport mechanisms, the Transport Control Protocol (TCP) layer 614 and the User Datagram Protocol (UDP) layer 616. A file system protocol layer provides multi-protocol data access and, to that end, includes support for the Common Internet File System (CIFS) protocol 618, the Network File System (NFS) protocol 620 and the Hypertext Transfer Protocol (HTTP) protocol 622. In addition, the operating system 600 includes a disk storage layer 624 that implements a disk storage protocol, such as a RAID protocol, and a disk driver layer 626 that implements a disk access protocol such as, e.g., a Small Computer Systems Interface (SCSI) protocol. Bridging the disk software layers with the network and file system protocol layers is a WAFL layer 680 that preferably implements the WAFL file system.

It should be noted that the software "path" through the storage operating system layers described above needed to perform data storage access for a user request received at the storage system may alternatively be implemented in hardware. That is, in an alternate embodiment of the invention, the storage access request data path 650 may be implemented as logic circuitry embodied within a field programmable gate array (FPGA) or an application specific integrated circuit (ASIC). This type of hardware implementation may increase the performance of the service provided by system 220 in response to a user request. Moreover, in another alternate embodiment of the invention, the processing elements of adapter 228 may be configured to offload some or all of the storage access operations from processor 222 to thereby increase the performance of the service provided by the storage system.

It is expressly contemplated that the various processes, architectures and procedures described herein can be implemented in hardware, firmware or software. For example, a common embodiment of the invention may comprise software code running on a general or special purpose computer, including an embedded microprocessor. However, it is entirely possible, and in some cases preferred, to implement the invention in a FPGA, an ASIC or in some other hardware or software embodiment. Those skilled in the art will understand that the inventive algorithm described herein can be implemented using a variety of technical means.

The illustrative embodiments set forth herein are described with respect to a concentrated parity arrangement, where the local parity blocks of each sub-array are all stored on the same disk. In yet another alternate embodiment of the invention, the inventive technique can be utilized in connection with other sub-array organizations, such as a distributed parity arrangement (e.g., RAID-5), where the location of the local parity blocks shifts from disk to disk in the sub-array in different sets of rows. However, a scaling aspect of the present invention (i.e., the ability to add disks to the array without reorganizing existing data and parity blocks in the future) practically applies to only the concentrated parity technique, since the configuration of diagonal parity sets takes into account the existence of "imaginary" (absent) disks having zero-valued blocks. This type of scaling would be quite difficult using a distributed parity arrangement wherein the rotated parity may fall on such imaginary disks.

In sum, the present invention operates on sub-arrays having sizes ranging from 2 top storage devices. That is, by repeating sub-arrays of 2 to p devices, with p–1 rows, the invention provides double failure protection within any sub-array and, hence, in the entire storage array. The proof is that the contents of a "sub-array" diagonal parity device for any one sub-array can be reconstructed by subtracting the computed diagonal parity of the other sub-arrays from the global diagonal parity device for the entire storage array. (Note that the single global diagonal parity device is the addition of the equivalent sub-array diagonal parity devices of the sub-arrays.) The invention requires that the blocking of stripes and the number of devices within each sub-array (other than the diagonal parity device) meet the constraints of the applicable double failure protection encoding method, as described herein with the R-D (or EO) encoded arrays.

While there have been shown and described illustrative embodiments for efficiently correcting multiple storage device failures in a storage array, it is to be understood that various other adaptations and modifications may be made within the spirit and scope of the invention. For example, in an alternate embodiment, the present invention can be used in the area of communications as a forward error correction technique that enables, e.g., multicast distribution of data over long latency links (e.g., satellite). In this embodiment, the data may be divided into storage elements, such as packets or units of data adapted for transmission over an electronic communications medium (network), with every pth packet containing the row parity XOR of the previous p–1 packets. A packet containing diagonal parity is sent after every n sets of p packets. It will be understood to those skilled in the art that other organizations and configurations of packets may be employed in accordance with the principles of the invention. Note that the row parity packets have to be at least as large as the largest data packet in each sub-group (set) and that the diagonal parity packet must be at least as large as the largest data packet in any subgroup. Also, the minimum diagonal parity packet size is p–1 bits, where p is the smallest prime number that is at least as large as the number of packets in any sub-group of packets. If one packet is dropped in a set of p, it is recoverable from the row parity. If two packets are dropped in one set of p, recovery may be achieved using diagonal parity.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system adapted to correct multiple storage device failures in a storage array, the system comprising:
   a storage array having a plurality of concatenated sub-arrays, each sub-array including a set of data storage devices and a local parity storage device, each sub-array assigned diagonal parity sets identically as if it were the only one present using a double failure protection encoding method, the array further including a global parity storage device holding diagonal parity computed by logically combining together a plurality of equivalent diagonal parity sets each from a differing one of the sub-arrays, wherein the global parity storage device is adapted to be used in connection with the local parity storage device of each sub-array to correct a double failure within the sub-array.

2. The system of claim 1 wherein the local parity storage device is configured to store values encoded with a single device error correction method used to correct a failure of a single device within a row parity set in the sub-array.

3. The system of claim 2 wherein the row parity set is a row of blocks.

4. The system of claim 2 wherein the encoding method that protects against a second device failure is independent of the single device error correction method.

5. The system of claim 4 wherein the double failure protection encoding method is row-diagonal encoding.

6. The system of claim 4 wherein the single device error correction method is row parity.

7. The system of claim 1 wherein each sub-array is organized as a concentrated parity device array.

8. The system of claim 1 wherein each sub-array is organized as a distributed parity device array.

9. The system of claim 1 wherein the storage devices are video tape, magnetic tape, optical, DVD, bubble memory, electronic random access memory or magnetic disk devices.

10. A method for encoding data for correction of double failures in a storage array, the method comprising the steps of:
   organizing the storage array as a plurality of concatenated sub-arrays, each sub-array including a set of data storage devices and a local parity storage device, the storage array further including a global parity storage device for holding diagonal parity;
   assigning diagonal parity sets to each sub-array identically as if the sub-array were the only one present using a double failure protection encoding method; and
   computing the diagonal parity by logically combining together a plurality of equivalent diagonal parity sets each from a differing one of the sub-arrays.

11. The method of claim 10 further comprising correcting storage device failure within the array using the local parity storage device associated with each sub-array and the global parity storage device associated with the storage array.

12. The method of claim 11 wherein the step of computing comprises the step of computing diagonal parity blocks along the diagonal parity sets of each sub-array.

13. A method for encoding data for correction of double failures in a storage array, the method comprising the steps of:
   organizing the storage array as a plurality of concatenated sub-arrays, each sub-array including a set of data storage devices and a local parity storage device, the storage array further including a global parity storage device for holding diagonal parity;
   assigning diagonal parity sets to each sub-array identically as if the sub-array were the only one present using a double failure protection encoding method;
   computing the diagonal parity by logically combining together equivalent diagonal parity sets in each of the sub-arrays and computing diagonal parity blocks along the diagonal parity sets of each sub-array, and logically combining the computed diagonal parity blocks of corresponding diagonal parity sets of the sub-arrays for storage as the diagonal parity on the global parity storage device; and
   correcting storage device failure within the array using the local parity storage device associated with each sub-array and the global parity storage device associated with the storage array.

14. The method of claim 13 wherein the step of logically combining comprises the step of using exclusive OR operations to compute the diagonal parity.

15. The method of claim 13 further comprising reconstructing the computed diagonal parity blocks of any sub-array with an error by subtracting the combined diagonal parity blocks of the other sub-arrays from the diagonal parity stored on the global parity storage device.

16. The method of claim 13 further comprising the step of storing parity values encoded with a single device error correction method on the local parity storage device of each sub-array.

17. The method of claim 16 further comprising correcting a failure of a single device within a row of blocks in each sub-array using the single device error correction method, where the single device correction method is accomplished using a plurality of local row parity.

18. The method of claim 17 wherein the encoding method that protects against a second device failure is independent of the single device error correction method.

19. The method of claim 18 wherein the single device error correction method is row-oriented and the rows of blocks in each sub-array are independent.

20. The method of claim 10 wherein the step of organizing comprises the step of organizing each sub-array as a concentrated parity device array.

21. The method of claim 10 wherein the step of organizing comprises the step of organizing each sub-array as a distributed parity device array.

22. The method of claim 10 wherein the storage devices are video tape, magnetic tape, optical, DVD, bubble memory, electronic random access memory or magnetic disk devices.

23. Apparatus for correcting double failures in a storage array, the apparatus comprising:
   means for organizing the storage array as a plurality of concatenated sub-arrays, each sub-array including a set of data storage devices and a local parity storage device, the storage array further including a global parity storage device for holding diagonal parity;
   means for assigning diagonal parity sets to each sub-array identically as if the sub-array were the only one present using a double failure protection encoding method;
   means for computing the diagonal parity using parity encoding operations that logically combine together a plurality of equivalent diagonal parity sets each from a differing one of the sub-arrays; and
   means for correcting storage device failure within the array using parity decoding operations on the local parity storage device associated with each sub-array and the global parity storage device associated with the storage array.

24. The apparatus of claim 23 wherein the means for organizing comprises means for organizing each sub-array as a concentrated parity device array.

25. The apparatus of claim 23 wherein the means for organizing comprises means for organizing each sub-array as a distributed parity device array.

26. The apparatus of claim 23 wherein the storage devices are video tape, magnetic tape, optical, DVD, bubble memory, electronic random access memory or magnetic disk devices.

27. The apparatus of claim 23 wherein the parity encoding and decoding operations are performed by special purpose hardware, such as a field programmable gate array or an application specific integrated circuit.

28. A computer readable medium containing executable program instructions for correcting double failures in a storage array, the executable program instructions comprising program instructions for:
   organizing the storage array as a plurality of concatenated sub-arrays, each sub-array including a set of data storage devices and a local parity storage device, the storage array further including a global parity storage device for holding diagonal parity;
   assigning diagonal parity sets to each sub-array identically as if the sub-array were the only one present using a double failure protection encoding method;
   computing the diagonal parity by logically combining together a plurality of equivalent diagonal parity sets each from a differing one of the sub-arrays; and correcting storage device failure within the array using the local parity storage device associated with each sub-array and the global parity storage device associated with the storage array.

29. The computer readable medium of claim 28 wherein the program instructions for computing comprise the program instructions for computing diagonal parity blocks along the diagonal parity sets of each sub-array.

30. A computer readable medium containing executable program instructions for correcting double failures in a storage array, the executable program instructions comprising program instructions for:

organizing the storage array as a plurality of concatenated sub-arrays, each sub-array including a set of data storage devices and a local parity storage device, the storage array further including a global parity storage device for holding diagonal parity;

assigning diagonal parity sets to each sub-array identically as if the sub-array were the only one present using a double failure protection encoding method;

computing the diagonal parity by logically combining together equivalent diagonal parity sets in each of the sub-arrays, computing diagonal parity blocks along the diagonal parity sets of each sub-array, and logically combining the computed diagonal parity blocks of corresponding diagonal parity sets of the sub-arrays for storage as the diagonal parity on the global parity storage device; and correcting storage device failure within the array using the local parity storage device associated with each sub-array and the global parity storage device associated with the storage array.

31. The computer readable medium of claim 30 wherein the program instruction for correcting comprises the program instruction for reconstructing the computed diagonal parity blocks of any sub-array by subtracting the combined diagonal parity blocks of the other sub-arrays from the diagonal parity stored on the global parity storage device.

32. The computer readable medium of claim 28 wherein the executable instructions are performed by a general or special purpose computer, including an embedded microprocessor.

33. A system adapted to correct multiple storage element failures in a storage array, the system comprising:

a storage array having a plurality of concatenated sub-arrays, each sub-array including a set of data storage elements and a local parity storage element configured to store values encoded with a single element error correction method used to correct a failure of a single element within a row parity set in the sub-array, each sub-array assigned diagonal parity sets identically as if it were the only one present using a double failure protection encoding method, the array further including a global parity storage element holding diagonal parity computed by logically combining together a plurality of equivalent diagonal parity sets such that each diagonal parity set is logically combined with at least one other equivalent diagonal parity set from a differing one of the sub-arrays, wherein the global parity storage element is used in connection with the local parity storage element of each sub-array to correct a double failure within the sub-array.

34. The system of claim 33 wherein the storage elements are packets and wherein logically combining together comprises use of exclusive OR (XOR) operations.

35. The system of claim 34 wherein p is a prime number and wherein every pth packet contains a row parity XOR of previous p−1 packets.

36. The system of claim 35 wherein a packet containing diagonal parity is sent after every n sets of p packets.

37. The system of claim 36 wherein, if one packet is dropped in a set of p, the packet is recoverable using row parity and if two packets are dropped in one set of p, the packets are recovered using row and diagonal parity.

38. A method for correcting double failures within data adapted for transmission over a communication medium, the method comprising the steps of:

dividing the data into packets for transmission over the communications medium;

organizing the packets into n sub-groups of p packets, wherein p is a smallest prime number that is at least as large as a number of packets in any sub-group of packets and wherein each sub-group of packets includes data packets and a local parity packet configured to store values encoded with a single error correction method used to correct a failure of a single packet in the sub-group;

assigning diagonal parity sets to each sub-group identically as if it were the only one present using a double failure protection encoding method; and providing a global parity packet with the group of packets, the global parity packet holding diagonal parity computed by logically combining equivalent diagonal parity sets in each of the sub-groups, wherein the global parity packet is used in connection with the local parity packet of each sub-group to correct a double failure within the sub-array.

39. The method of claim 38 wherein logically combining together comprises use of exclusive OR (XOR) operations and wherein every pth packet contains a row parity XOR of previous p−1 packets.

40. The method of claim 39 wherein the step of providing comprises the step of sending the global parity packet containing diagonal parity after every n sub-group of p packets.

41. The method of claim 40 further comprising the steps of:

if one packet is dropped in a set of p, recovering the packet using row parity; and if two packets are dropped in one set of p, recovering the packets using row and diagonal parity.

42. A method for encoding data for correction of double failures in a storage array, comprising:

organizing the storage array as a plurality of sub-arrays, each sub-array including a set of data storage devices and a plurality of local parity storage blocks, each of the plurality of local storage blocks storing parity information for a corresponding sub-array;

assigning diagonal parity sets to each sub-array as if the sub-array were the only one present using a double failure protection encoding method;

including a plurality of global diagonal parity storage blocks, the global diagonal parity storage blocks holding global diagonal parity; and computing the global diagonal parity by logically combining together a plurality of equivalent diagonal parity sets such that each diagonal parity set is logically combined with at least one other equivalent diagonal parity set from a differing one the sub-arrays.

43. The method of claim 42, further comprising:

storing the plurality of global diagonal parity storage blocks in a global parity storage device.

44. The method of claim 42, further comprising: logically combining the computed diagonal parity blocks of corresponding diagonal parity sets of the sub-arrays for storage as the diagonal parity on the plurality of global parity storage blocks.

45. The method of claim 44 wherein the step of logically combining comprises the step of using exclusive OR operations to compute the diagonal parity.

46. The method of claim 45 further comprising reconstructing the computed diagonal parity blocks of any sub-array with an error by subtracting the combined diagonal parity blocks of the other sub-arrays from the diagonal parity stored on the global parity storage device.

47. The method of claim 42, further comprising:
distributing the plurality of global diagonal parity storage blocks across the storage array.

48. The method of claim 42, further comprising:
storing the plurality of local parity storage blocks in a local parity storage device.

49. The method of claim 42, further comprising:
distributing the plurality of local parity storage blocks across the storage array.

50. An apparatus for encoding data for correction of double failures in a storage array, comprising:
means for organizing the storage array as a plurality of sub-arrays, each sub-array including a set of data storage devices and a plurality of local parity storage blocks, each of the plurality of local storage blocks storing parity information for a corresponding sub-array;
means for assigning diagonal parity sets to each sub-array as if the sub-array were the only one present using a double failure protection encoding method;
means for including a plurality of global diagonal parity storage blocks, the global diagonal parity storage blocks holding global diagonal parity; and
means for computing the global diagonal parity by logically combining together a plurality of equivalent diagonal parity sets such that each diagonal parity set is logically combined with at least one other equivalent diagonal parity set from a differing one of the sub-arrays.

51. The apparatus of claim 50, further comprising:
means for storing the plurality of global diagonal parity storage blocks in a global parity storage device.

52. The apparatus of claim 50, further comprising:
means for logically combining the computed diagonal parity blocks of corresponding diagonal parity sets of the sub-arrays for storage as the diagonal parity on the plurality of global diagonal parity storage blocks.

53. The apparatus of claim 52 wherein the step of logically combining comprises the means for using exclusive OR operations to compute the diagonal parity.

54. The apparatus of claim 53 further comprising:
means for reconstructing the computed diagonal parity blocks of any sub-array with an error by subtracting the combined diagonal parity blocks of the other sub-arrays from the diagonal parity stored on the global parity storage device.

55. The apparatus of claim 50, further comprising:
means for distributing the plurality of global diagonal parity storage blocks across the storage array.

56. The apparatus of claim 50, further comprising:
means for storing the plurality of local parity storage blocks in a local parity storage device.

57. The apparatus of claim 50, further comprising:
means for distributing the plurality of local parity storage blocks across the storage array.

58. A system for encoding data for correction of double failures, comprising:
a storage array organized as a plurality of sub-arrays, each sub-array including a set of data storage devices and a plurality of local parity storage blocks, each of the local parity storage blocks storing parity information for a corresponding sub-array;
a storage operating system within a storage system to assign diagonal parity sets to each sub-array as if the sub-array were the only one present using a double failure protection encoding method;
a plurality of global diagonal parity storage blocks within the storage array, the global diagonal parity storage blocks holding global diagonal parity; and
the storage operating system computing the global diagonal parity by logically combining together equivalent diagonal parity sets in each of the sub-arrays such that each diagonal parity set is logically combined with at least one other equivalent diagonal parity set from a differing one of the sub-arrays.

59. The system of claim 58, further comprising:
a global parity storage device for storing the plurality of global diagonal parity storage blocks.

60. The system of claim 58, further comprising: the operating system logically combines the computed diagonal parity blocks of corresponding diagonal parity sets of the sub-arrays for storage as the diagonal parity on the plurality of global diagonal parity storage blocks.

61. The system of claim 60 wherein the operating system logically combines using exclusive OR operations to compute the diagonal parity.

62. The system of claim 61 wherein the operating system corrects error by reconstructing the computed diagonal parity blocks of any sub-array with an error by subtracting the combined diagonal parity blocks of the other sub-arrays from the diagonal parity stored on the global parity storage device.

63. The system of claim 58, further comprising:
the storage operating system for distributing the plurality of global diagonal parity storage blocks across the storage array.

64. The system of claim 58, further comprising:
a local parity storage device for storing the plurality of local parity storage blocks.

65. The system of claim 58, further comprising:
the storage operating system for distributing the plurality of local parity storage blocks across the storage array.

66. A computer readable media, comprising:
said computer readable media having instructions written thereon for execution on a processor for the practice of the method of encoding data for correction of double failures in a storage array, comprising:
organizing the storage array as a plurality of sub-arrays, each sub-array including a set of data storage devices and a plurality of local parity storage blocks, each of the plurality of local storage blocks storing parity information for a corresponding sub-array;
assigning diagonal parity sets to each sub-array as if the sub-array were the only one present using a double failure protection encoding method;
including a plurality of global diagonal parity storage blocks, the global diagonal parity storage blocks holding global diagonal parity; and
computing the global diagonal parity by logically combining together equivalent diagonal parity sets in each of the sub-arrays such that each diagonal parity set is logically combined with at least one other equivalent diagonal parity set from a differing one of the sub-arrays.

67. A method for correcting double failures within data adapted for transmission over a communication medium, the method comprising the steps of:
dividing the data into packets for transmission over the communications medium;
organizing the packets into subgroups, wherein each subgroup of packets includes data packets and a local parity packet configured to store values encoded with a single error correction method used to correct a failure of a single packet within the subgroup;
assigning diagonal parity sets to each subgroup as if it were the only subgroup present using a double failure protection encoding method; and
providing a global parity packet within the group of packets, the global parity packet holding diagonal parity computed by logically combining together a plurality of equivalent diagonal parity sets in each of the subgroups such that each diagonal parity set is logically combined with at least one other equivalent diagonal parity set from a differing one of the subgroups, wherein the global parity packet is used in connection with the local parity packet of each subgroup to correct a double failure within the subgroup.

68. The method of claim 67 wherein logically combining together comprises use of exclusive Or (XOR) operations.

69. The method as defined in claim 67 wherein the step of organizing the packets into subgroups, comprises:
organizing the packets into n sub-groups of p packets wherein p is a smallest prime number that is at least as large as a number of packets in any subgroup of packets.

70. The method as defined in claim 69 further comprising the step of:
sending the global parity packet containing diagonal parity after every n sub-group of p packets.

71. The method of claim 69 further comprising the steps of:
if one packet is dropped in the set of p, recovering the packet using row parity; and
if two packets are dropped in one set of p, recovering the packets using row and diagonal parity.

72. The method of claim 13 wherein the step of correcting comprises the step of reconstructing a failed diagonal parity block by logically combining equivalent diagonal parity sets in all sub-arrays.

73. The method of claim 13 wherein the step of correcting comprises the step of reconstructing failed row parity blocks from data disks of the sub-array and failed diagonal parity blocks from equivalent diagonal parity sets in all sub-arrays.

74. The method of 13 wherein the step of correcting comprises the step of reconstructing a failed data disk block using local row parity and a failed global diagonal parity disk block from equivalent diagonal parity sets in all sub-arrays.

75. An apparatus for correcting double failures within data adapted from transmission over a communications medium, comprising:
means for dividing the data into packets for transmission over the communications medium;
means for organizing the packets into subgroups, wherein each subgroup of packets includes data packets and a local parity packet configured to store values encoded with a single error correction method used to correct a failure of a single packet within the subgroup;
means for assigning diagonal parity sets to each subgroup as if it were the only subgroup present using a double failure protection encoding method; and
means for providing a global parity packet within the group of packets, the global parity packet holding diagonal parity computed by logically combining together a plurality of equivalent diagonal parity sets in each of the subgroups such that each diagonal parity set is logically combined with at least one other equivalent diagonal parity set from a differing one of the subgroups, wherein the global parity packet is used in connection with the local parity packet of each subgroup to correct a double failure within the subgroup.

76. The apparatus of claim 75 wherein logically combining together comprises use of exclusive Or (XOR) operations.

77. The apparatus of claim 75 wherein means for organizing the packets into subgroups, further comprises:
means for organizing the packets into n sub-groups of p packets wherein p is a smallest prime number that is at least as large as a number of packets in any subgroup of packets.

78. A method for correcting multiple storage element failures in a storage array, the method comprising the steps of:
dividing the storage array into a first sub-array and a second sub-array, the first sub-array and the second sub-array each including a plurality of storage devices;
calculating row parity for the first sub-array and storing the row parity for the first-sub array on one or more storage devices of the first sub-array;
calculating row parity for the second sub-array and storing the row parity for the second sub-array on one or more storage devices of the second sub-array;
selecting a plurality of diagonal parity sets on the first sub-array;
selecting a plurality of diagonal parity sets on the second sub-array;
pairing each diagonal parity set on the first sub-array with a corresponding diagonal parity set on the second sub-array, and calculating a global diagonal parity value for each pair of diagonal parity sets; and
storing the global diagonal parity values on one or more storage devices of the storage array.

79. A system for correcting multiple storage element failures comprising:
a storage array organized into a first sub-array and a second sub-array, the first sub-array and the second sub-array each including a plurality of storage devices, the first sub-array storing row parity information on one or more storage devices of the first sub-array, the second sub-array storing row parity information on one or more storage devices of the second sub-array;
a storage operating system configured to select a plurality of diagonal parity sets on the first sub-array and to select a plurality of diagonal parity sets on the second sub-array and configured to pair each diagonal parity set on the first sub-array with a corresponding diagonal parity set on the second sub-array, and calculate a global diagonal parity value for each pair of diagonal parity sets, the storage operating system further configured to store the global diagonal parity values on one or more storage devices of the storage array.

* * * * *